US005817965A

United States Patent [19]

Matsumoto

[11] Patent Number: 5,817,965

[45] Date of Patent: Oct. 6, 1998

[54] APPARATUS FOR SWITCHING SINGING VOICE SIGNALS ACCORDING TO MELODIES

[75] Inventor: Shuichi Matsumoto, Hamamatsu, Japan

[73] Assignee: Yamaha Corporation, Hamamatsu, Japan

[21] Appl. No.: 975,758

[22] Filed: Nov. 21, 1997

[30] Foreign Application Priority Data

Nov. 29, 1996 [JP] Japan .................................... 8-320221

[51] Int. Cl.[6] ............................... G09B 5/00; G10H 1/08; G10H 1/26

[52] U.S. Cl. ................................ 84/610; 84/615; 84/625; 434/307 A

[58] Field of Search ............................. 84/609–620, 625, 84/634–638

[56] References Cited

U.S. PATENT DOCUMENTS 5,484,291 1/1996 Nakai et al. .......................... 84/610 X
5,668,339 9/1997 Shin .......................................... 84/634

*Primary Examiner*—Stanley J. Witkowski

*Attorney, Agent, or Firm*—Pillsbury Madison & Sutro LLP

[57] ABSTRACT

A switching apparatus is constructed for discriminating a plurality of singing voices from each other based on a reference melody in order to pass the discriminated singing voices to different audio processes. In the apparatus, a plurality of input devices are provided to collect a plurality of singing voices separately from each other, each input device producing a voice signal which carries an individual melody of the singing voice collected by each input device. A plurality of output terminals are arranged to pass the voice signals separately from each other to the different audio processes. A switch circuit is disposed between the input devices and the output terminals to provide a plurality of electrical paths which are switchable with each other so as to distribute the voice signals from the plurality of the input devices to the plurality of the output terminals through the electrical paths. A controller device examines matching degrees of the individual melodies carried by the voice signals with respect to the reference melody so as to discriminate the voice signals from each other, and controls the switch circuit based on the examined matching degrees to switch the electrical paths to thereby route the discriminated voice signals from the plurality of the input devices to the plurality of the output terminals.

25 Claims, 7 Drawing Sheets

APPARATUS FOR SWITCHING SINGING VOICE SIGNALS ACCORDING TO MELODIES

BACKGROUND OF THE INVENTION

1. Field of the Invention

The present invention generally relates to a singing voice signal switching apparatus that determines melody parts of a plurality of inputted singing voice signals and that distributes the determined melody parts to predetermined processing modules through switchable paths.

2. Description of Related Art

As karaoke apparatuses have become popular, the singing skill of users has been so enhanced that they desire to sing parts other than a main melody of a karaoke song. To satisfy such a demand, there are provided increasing number of karaoke music pieces having a plurality of vocal parts such as harmony melody parts in addition to a main melody part. In these pieces of karaoke music, the main melody part is easy to memorize and follow a melody line, and hence relatively easy to sing. However, other parts such as a harmony melody part than the main part are hard to master, and the melody of the harmony melody part is often difficult, so that it is difficult to sing such a part in tune.

One possible solution of this problem is to correct the singing of a sub part such as a harmony moldy part by modifying the pitch of the singing voice signal by audio processing in real time. To do so, it is necessary for the singing voice signal of the main melody part and the other singing voice signal of the harmony melody part to be processed in separate audio processing modules. It is also necessary to separately provide a main vocal microphone for collecting singing voice of the main melody part and a sub vocal microphone for collecting singing voice of the harmony melody part. However, on an actual karaoke stage, it is a general practice for a singer to use any of the microphones that lies nearest to him or her. It is therefore difficult to correctly allocate the main and sub microphones to joint singers. Stated otherwise, the microphones are interchangeably used by the joint singers so that the voice signals of the main and sub parts may not be fed correctly to corresponding audio processing modules.

SUMMARY OF THE INVENTION

It is therefore an object of the present invention to provide a singing voice signal switching apparatus for discriminating between one singing voice signal of a main melody part and another singing voice signal of a harmony melody part inputted from anonymous microphones and for distributing the discriminated singing voice signals to corresponding audio processing modules.

The inventive switching apparatus is constructed for discriminating a plurality of singing voices from each other based on a reference melody in order to pass the discriminated singing voices to different audio processes. In the apparatus, a plurality of input devices are provided to collect a plurality of singing voices separately from each other, each input device producing a voice signal which carries an individual melody of the singing voice collected by each input device. A plurality of output terminals are arranged to pass the voice signals separately from each other to the different audio processes. A switch circuit is disposed between the input devices and the output terminals to provide a plurality of electrical paths which are switchable with each other so as to distribute the voice signals from the plurality of the input devices to the plurality of the output terminals through the electrical paths. A controller device examines matching degrees of the individual melodies carried by the voice signals with respect to the reference melody so as to discriminate the voice signals from each other, and controls the switch circuit based on the examined matching degrees to switch the electrical paths to thereby route the discriminated voice signals from the plurality of the input devices to the plurality of the output terminals.

Preferably, each input device produces the voice signal carrying the individual melody containing a leading section and a subsequent section. The controller device controls the switch circuit based on the matching degrees examined for the leading sections of the individual melodies to switch the electrical paths, and thereafter maintains the switched electrical paths for the subsequent sections of the individual melodies.

Preferably, the controller device comprises a detector that detects a difference between each individual melody and the reference melody to calculate a score point of each singing voice, and a comparator that compares the score points of the singing voices with each other to determine the matching degrees of the singing voices.

The present invention further covers a karaoke apparatus constructed for playing a karaoke song according to song data jointly with at least a pair of singing voices while applying thereto different audio processes. In the karaoke apparatus, a generator device processes the song data to produce an orchestral accompaniment sound during the course of play of the karaoke song. A pair of input devices are provided to collect a pair of singing voices having melodies different from each other. A pair of output devices are arranged to apply the different audio processes to the singing voices separately from each other. A switch device provides a pair of paths which are switchable with each other so as to distribute the singing voices from the pair of the input devices to the pair of the output devices. A controller device examines matching degrees of the melodies carried by the singing voices with respect to a reference melody specified by the song data so as to discriminate the singing voices from each other, and controls the switch device based on the examined matching degrees to switch the paths to thereby route the discriminated singing voices from the plurality of the input devices to the plurality of the output devices. A mixer device mixes the singing voices fed from the output devices with the orchestral accompaniment sound to thereby effect play of the karaoke song.

In a form, the controller device discriminates between one of the singing voices having a high matching degree and the other of the singing voices having a low matching degree. One of the output devices is arranged to apply an audio process to the one singing voice as a main vocal part, and the other of the output devices is arranged to apply another audio process to the other singing voice such that the other singing voice is converted into a sub vocal part to support the main vocal part.

In another form, the controller device discriminates between one of the singing voices having a high matching degree and the other of the singing voices having a low matching degree. One of the output devices is arranged to apply an audio process to the one singing voice such that the one singing voice having the high matching degree is sounded, and the other of the output devices is arranged to apply another audio process to the other singing voice such that the other singing voice having the low matching degree is muted.

In a further form, the controller device discriminates between one of the singing voices which is sung in tune along a main vocal part and the other of the singing voices which is sung out of tune along a harmony vocal part. One of the output devices is arranged to apply an audio process to the one singing voice such that a pitch of the one singing voice is maintained, and the other of the output devices is arranged to apply another audio process to the other singing voice such that a pitch of the other singing voice is corrected in tune along the harmony vocal part. The other output device may include a muting section that mutes the other singing voice when the same is incorrectly sung at a rest event contained in the harmony vocal part. The one output device may include a harmony section that operates when the other singing voice is not sung incorrectly to miss note events contained in the harmony vocal part for modifying the one singing voice to fit with the harmony vocal part in place of the other missing singing voice.

In an alternative form, the controller device discriminates between one of the singing voices which is sung in tune along a solo vocal part and the other of the singing voices which is sung out of tune along a chorus vocal part. One of the output devices is arranged to apply an audio process to the one singing voice such that a pitch of the one singing voice is maintained, and the other of the output devices is arranged to apply another audio process to the other singing voice such that a pitch of the other singing voice is corrected in tune along the chorus vocal part. The other output device may include a muting section that mutes the other singing voice when the same is incorrectly sung at a rest event contained in the chorus vocal part. The generator device may include a chorus section that generates a synthetic singing voice. The mixer device includes a section that operates when the other singing voice is not sung for mixing the synthetic singing voice o fill the chorus vocal part in place of the other singing voice, and that operates when the other singing voice is sung for muting the synthetic singing voice. The one output device may include a harmony section that creates a harmony singing voice which is derived from the one singing voice and which is made consonant with the one singing voice.

The singing voice signal switching apparatus according to the present invention has a plurality of song input devices and a plurality of song output terminals. The song input devices are microphones for example. The plurality of song output terminals are connected to different voice signal processing modules. Singing voice signals outputted from the song input devices are to be identified separately. To do so, it is determined how much each of the singing voice signals matches a particular reference melody. Based on the degree of the matching, the singing voice signals are distributed to their corresponding song output terminals. For example, when singing voice signals of a main melody and a harmony melody are concurrently inputted, if a particular reference melody corresponds to the main melody for example, one of the singing voice signals that best matches the main melody is outputted from the song output terminal assigned to a main melody processing module, while the other singing voice signal is outputted from the other song output terminal assigned to a harmony melody processing module. If a plurality of singers sing a plurality of vocal parts through any microphones of a karaoke apparatus for example, the above-mentioned novel arrangement allows the karaoke apparatus to identify the vocal parts of the singing voice signals inputted from the microphones, and to distribute the identified vocal parts to their corresponding processing modules.

Further, the output gain of one of the signal processing modules can be set to zero so as to prevent the singing voice signal distributed to that processing module from being sounded. Namely, this singing voice signal can be cut. For example, the novel arrangement provides select capability of singing voices which are concurrently sung by a pair of singers along the same solo melody. The singing voice best match to the solo melody is sounded from the valid output processing module, and the other singing voice signal is switched to the invalid output processing module of which gain is set to zero, thereby muting or cutting the other singing voice. The pair of the singers can enjoy to contest their vocal performance. The singing voice of the winner is actually sounded while the singing voice of the loser is muted.

Still further, according to the present invention, the above-mentioned matching degree of the singing voice is determined in a predetermined interval (for example, a leading phrase) and this determination is maintained subsequently. This arrangement prevents the determination result from being overturned halfway, thereby preventing such confusion from happening as switching halfway the destination processing modules of a plurality of inputted singing voice signals.

BRIEF DESCRIPTION OF THE DRAWINGS

The invention will be more particularly described with reference to the accompanying drawings, in which.

DETAILED DESCRIPTION OF THE PREFERRED EMBODIMENTS

This invention will be described in further detail by way of example with reference to the accompanying drawings.

Figure 1:
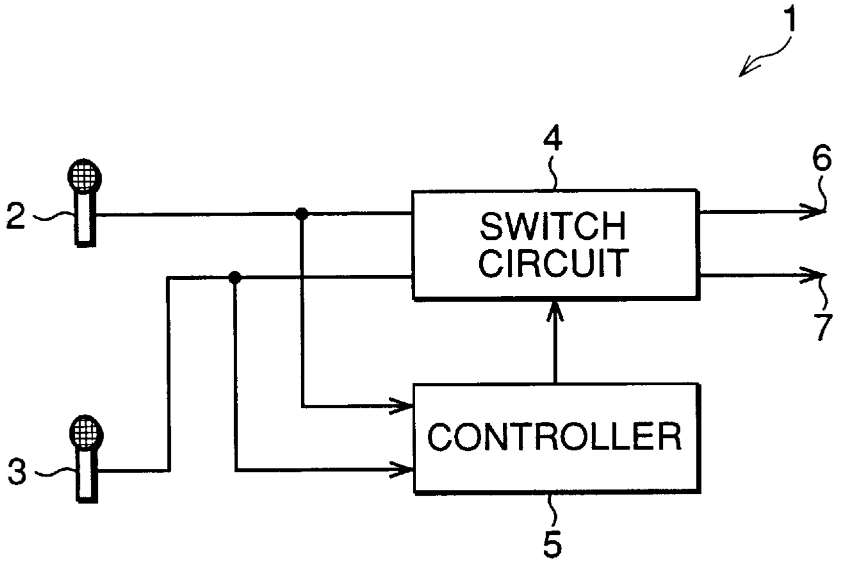
FIG. 1 is a diagram illustrating a constitution of a voice signal switching apparatus practiced as one preferred embodiment of the invention.

Now, referring to FIG. 1, there is shown a diagram illustrating an embodiment of the singing voice switching apparatus according to the invention. This switching apparatus 1 is applied to a karaoke apparatus. In this singing voice switching apparatus, for example, pitches of singing voice signals inputted from two microphones are compared with reference data representative of a main melody. The singing voice signal determined as the main melody is outputted from a main output terminal to a main melody processing module, and the other singing voice signal is outputted from a sub output terminal to a sub melody processing module. These main output terminal and sub output terminal are connected to the corresponding processing modules.

The pair of microphones 2 and 3 are connected to a switch circuit 4 and a controller 5 of the signing voice switching apparatus 1. The switch circuit 4 connects the microphones 2 and 3 to a main output terminal 6 and a sub output terminal 7 in an interchangeable manner. The main output terminal 6 is connected to an audio processing module such as a main vocal effector for attaching an effect such as echo to the singing voice signal of a main melody. The sub output terminal 7 is connected to another audio processing module such as a pitch corrector for correcting the pitch of the singing voice signal of a harmony melody. The switching operation of the switch circuit 4 is controlled by the controller 5. First, when the karaoke apparatus starts karaoke play, the switch circuit 4 connects both of the microphones 2 and 3 to the main output terminal 6. Therefore, when the karaoke apparatus starts, the singing voice signals inputted from the microphones 2 and 3 are both processed as a main melody. At the same time, the singing voice signals produced by the microphones 2 and 3 are inputted into the controller 5. The controller 5 analyzes both the singing voice signals during a time interval from the start of the main melody of the karaoke music to the end of a first or leading phrase to determine which of the voice signals matches the main melody better. Then, the controller 5 maintains the microphone from which the better matching signing voice signal has been inputted to the main output terminal 6, and instructs the switch circuit 4 to switch the other microphone to the sub output terminal 7. The switch circuit 4 switches between the microphones according to the matching degree of the singing voices with respect to the reference data representative of the main melody.

Figure 2:
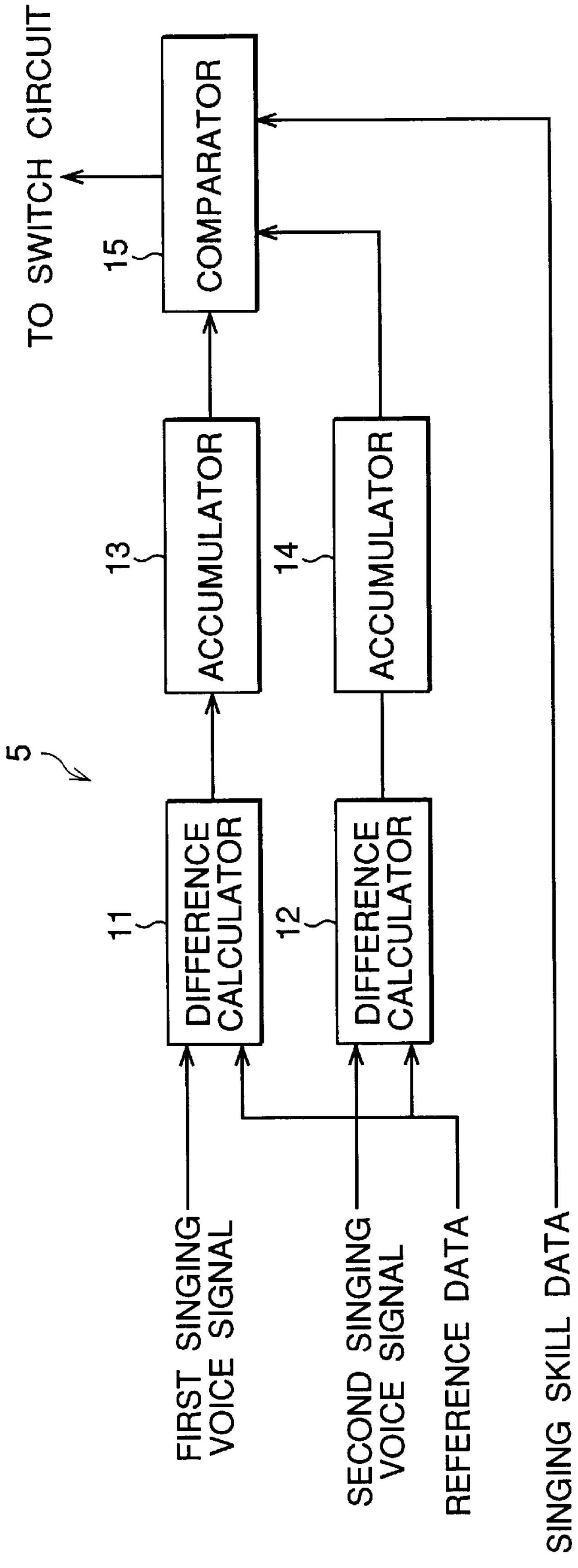
FIG. 2 is a schematic block diagram illustrating a constitution of the voice signal switching apparatus of FIG. 1.

FIG. 2 shows a constitution of the above-mentioned controller 5. The two microphones 2 and 3 are connected to difference calculators 11 and 12, respectively. In these difference calculators 11 and 12, main melody data is inputted as a reference melody. This main melody data is contained in the song data for karaoke performance and read out in synchronization with progression of the karaoke performance. The difference calculator 11 calculates difference between a first signing voice signal inputted from the microphone 2 and the main melody data. The other difference calculator 12 calculates difference between a second singing voice signal inputted from the microphone 3 and the main melody data. The difference data is obtained by quantification of the difference between the pitch and volume specified by the main melody data and the pitch and volume of the singing voice signal inputted from the microphone as well as the difference between the sounding timing indicated by the main melody data and the sounding timing of the singing voice signal. These pieces of difference data are inputted in accumulators 13 and 14. The accumulators 13 and 14 accumulate the difference data sequentially inputted as the karaoke performance progresses. In addition, the accumulators 13 and 14 operate based on the accumulated difference data in a predetermined timing to determine the degrees of matching of the first and second singing voice signals with the main melody data, and output the matching degrees as score point values. These point values are inputted to a comparator 15. The comparator 15 compares the inputted point value of the first singing voice signal with the inputted point value of the second singing voice signal to determine which is closer to the main melody. Then, the comparator 15 instructs the switch circuit 4 to connect the microphone from which the singing voice signal found closer to the main melody has been inputted to the main output terminal 6, and to connect the other microphone to the sub output terminal 7.

In the above-mentioned constitution, the accumulator 13 is adapted to output the matching degree of the singing voice signal with respect to the main melody data as a score point value. The main melody data of karaoke music represents a so-called guide melody included in song data, and is obtained by simply converting notes of the main melody into MIDI data. Therefore, even if a singing voice signal well matches the main melody data, it does not necessarily indicate that the song is well sung. To make scoring more precise, singing skill data may be inputted in the accumulator 13 to compare a singing voice signal to this data. To be more specific, the singing skill data indicates high singing skills such as vibrato and slur. If this singing skill data is used, the pitch and volume differences due to the manipulation of vibrato which is a minute frequency fluctuation relative to the main melody data and slur which smoothly moves frequency and volume can be counted as a plus factor rather than a minus factor, thereby correctly evaluating singing skill in points. The scoring based on the singing skill data is disclosed in Japanese Patent Application Nos. Hei 8-225069, Hei 8-233189, and Hei 8-233190 filed by the applicant hereof.

As described above, the inventive switching apparatus is constructed for discriminating a plurality of singing voices from each other based on a reference melody in order to pass the discriminated singing voices to different audio processes. In the apparatus 1, a plurality of input devices in the form of the microphones 2 and 3 are provided to collect a plurality of singing voices separately from each other, each input device producing a voice signal which carries an individual melody of the singing voice collected by each input device. A plurality of output terminals in the form of a main output terminal 6 and a sub output terminal 7 are arranged to pass the voice signals separately from each other to the different audio processes. A switch circuit 4 is disposed between the input devices and the output terminals to provide a plurality of electrical paths which are switchable with each other so as to distribute the voice signals from the plurality of the input devices to the plurality of the output terminals through the electrical paths. A controller device 5 examines matching degrees of the individual melodies carried by the voice signals with respect to the reference melody so as to discriminate the voice signals from each other, and controls the switch circuit 4 based on the examined matching degrees to switch the electrical paths to thereby route the discriminated voice signals from the plurality of the input devices 2 and 3 to the plurality of the output terminals 6 and 7.

Preferably, each input device produces the voice signal carrying the individual melody containing a leading section such as the first phrase of the karaoke music and a subsequent section. The controller device 5 controls the switch circuit 4 based on the matching degrees examined for the leading sections of the individual melodies to switch the electrical paths, and thereafter maintains the switched electrical paths for the subsequent sections of the individual melodies.

Preferably, the controller device 5 comprises a detector in the form of a difference calculator I1 that detects a difference between each individual melody and the reference melody to calculate a score point of each singing voice, and a comparator 15 that compares the score points of the singing voices with each other to determine the matching degrees of the singing voices.

Figure 3:
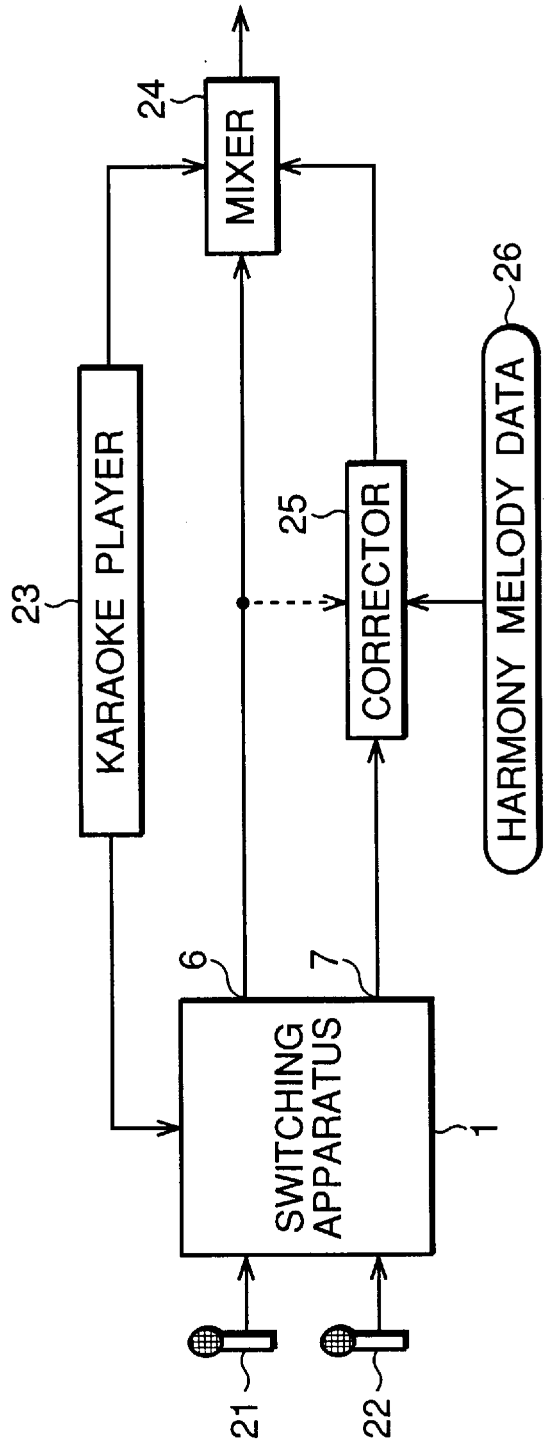
FIG. 3 is a schematic block diagram illustrating a karaoke apparatus using the voice signal switching apparatus of FIG. 1.
Figure 4:
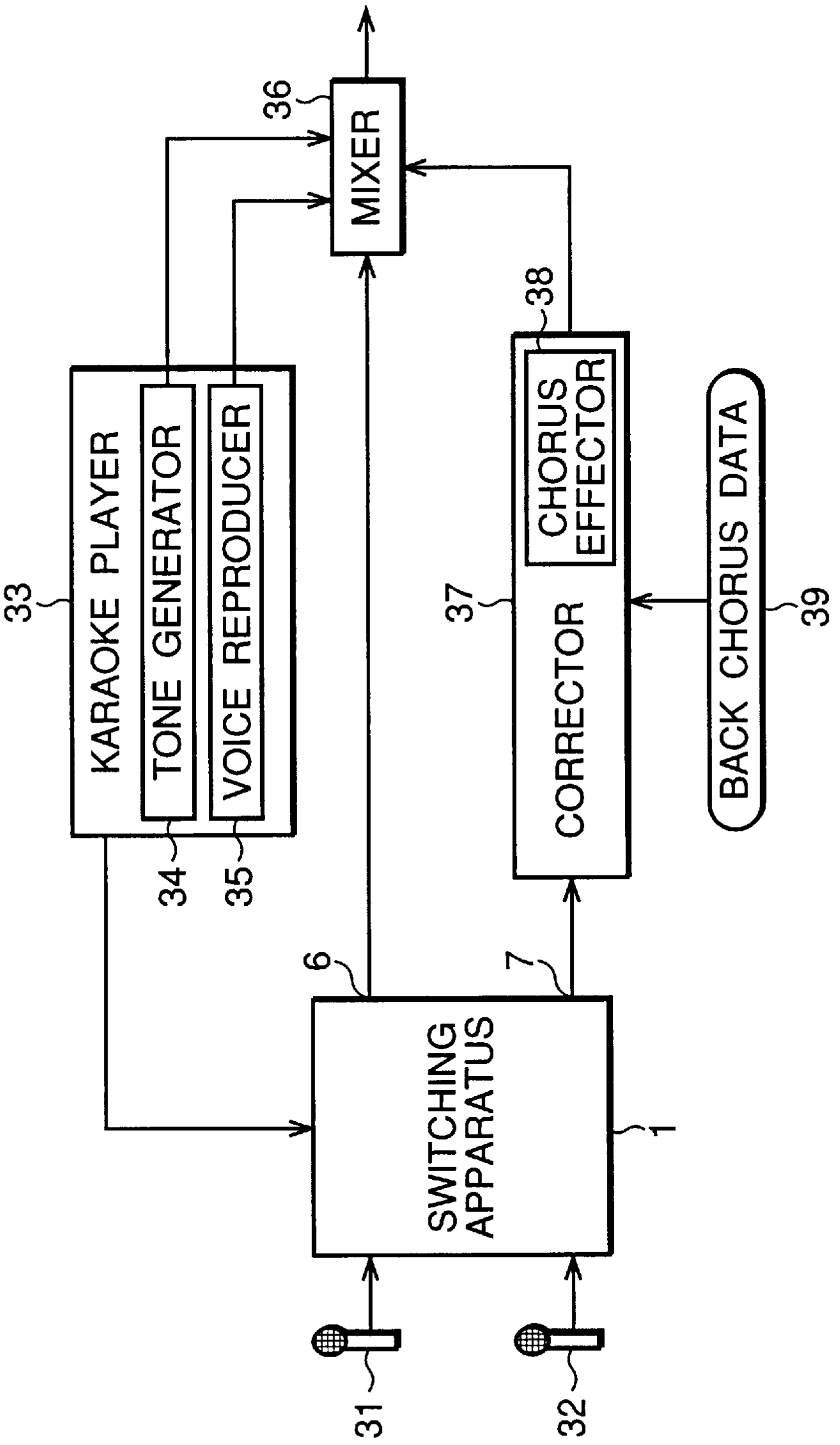
FIG. 4 is a schematic block diagram illustrating another karaoke apparatus using the voice signal switching apparatus of FIG. 1.
Figure 5:
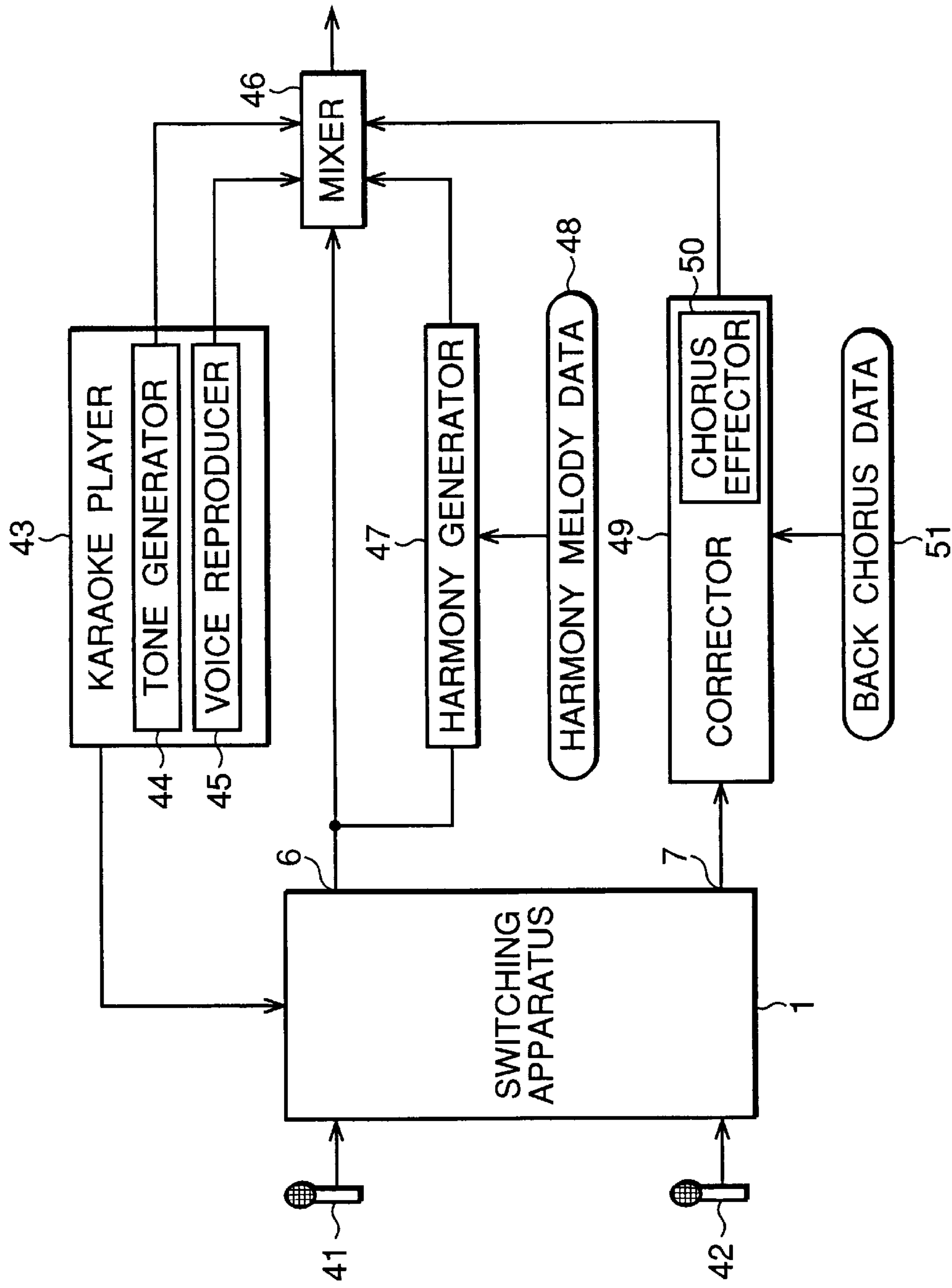
FIG. 5 is a schematic block diagram illustrating a further karaoke apparatus using the voice signal switching apparatus of FIG. 1.

FIGS. 3 through 5 show schematic block diagrams illustrating karaoke apparatuses to which the above-mentioned singing voice signal switching apparatus is applied. FIG. 3 is a schematic block diagram illustrating a karaoke apparatus in which singing voice signals inputted from two microphones 21 and 22 are switched by a singing voice signal switching apparatus 1 to a main output terminal 6 for main melody output or a sub output terminal 7 for harmony melody output. The main output terminal 6 of the switching apparatus 1 is connected to a mixer 24, and the sub output terminal 7 is connected to a corrector 25. One of the two microphones 21 and 22 is used by a singer who sings the main melody of a karaoke music piece and the other is used by another singer who sings the harmony melody. In the switching apparatus 1, main melody data is inputted as reference from a karaoke player 23. Based on the inputted main melody data, the switching apparatus 1 determines which of the singing voice signals inputted from the microphones 21 and 22 represents the main melody. This determination is made when singing of one phrase from the start of karaoke music performance ends based on difference data for one phrase. The switching apparatus 1 distributes or directs the singing voice signal corresponding to the main melody to the mixer 24, and distributes or directs the other singing voice signal to the corrector 25. The corrector 25 is an audio processor which corrects the frequency of this singing voice signal to the frequency of the correct harmony melody. Namely, because the harmony melody has a difficult melody line and a difficult singing start timing, the singer sometimes may get out of pitch even if he or she thinks singing properly, or may miss singing at all. Therefore, the singing voice signal of the harmony melody is correctly matched by the corrector 25 to the pitch of the harmony melody. This correction is made based on harmony melody data 26, which is MIDI data representing the harmony melody. This harmony melody data 26 is included in the song data for karaoke performance, and read out in synchronization with progression of the karaoke performance by the karaoke player 23. The singing voice signal corrected by the corrector 25 to the correct harmony melody pitch is inputted to the mixer 24.

The karaoke player 23 reads the song data for karaoke performance to generate a tone signal of an orchestral accompaniment sound. The generated tone signal is inputted into the mixer 24. The mixer 24 mixes the tone signal inputted from the karaoke player 23, the main melody singing voice signal inputted from the switching apparatus 1, and the corrected harmony melody singing voice signal inputted from the corrector 25 together at a predetermined gain ratio, and outputs the resultant signal as a 2-channel stereo signal. The mixer 24 is connected at its succeeding stage with an audio amplifier and a speaker by which the stereo signal is amplified and sounded.

The above-mentioned corrector 25 not only corrects the harmony melody singing voice signal to the pitch of the correct harmony melody, but also performs the following processing. When the harmony melody need not be sung at a rest, a singing voice signal of the harmony melody part may be inputted erroneously. Namely, if a singer sings erroneously at a rest event where no harmony melody is required, this singing voice signal is muted so as not to intervene the main melody. Conversely, no signing voice signal of the harmony melody part may be inputted at note events where the harmony melody should be sung. Namely, if a singer does not sing where he or she should, the singing voice signal of the main melody is frequency-converted into the singing voice signal of the harmony melody.

As described above, the present invention covers a karaoke apparatus constructed for playing a karaoke song according to song data jointly with at least a pair of singing voices while applying thereto different audio processes. In the karaoke apparatus shown in FIG. 3, a generator device in the form of the karaoke player 23 processes the song data to produce an orchestral accompaniment sound during the course of play of the karaoke song. A pair of input devices are provided in the form of microphones 21 and 22 to collect a pair of singing voices having melodies different from each other. A pair of output devices are arranged to apply the different audio processes to the singing voices separately from each other. A switch circuit in the switching apparatus 1 provides a pair of paths which are switchable with each other so as to distribute the singing voices from the pair of the input devices to the pair of the output devices. A controller device provided also in the switching apparatus 1 examines matching degrees of the melodies carried by the singing voices with respect to a reference melody specified by the song data so as to discriminate the singing voices from each other, and controls the switch circuit based on the examined matching degrees to switch the paths to thereby route the discriminated singing voices from the pair of the input devices to the pair of the output devices. A mixer device 24 mixes the singing voices fed from the output devices with the orchestral accompaniment sound to thereby effect play of the karaoke song. More specifically, the controller device discriminates between one of the singing voices which is sung in tune along a main vocal part and the other of the singing voices which is sung out of tune along a harmony vocal part. One of the output devices is arranged to apply an audio process to the one singing voice such that a pitch of the one singing voice is maintained, and the other of the output devices is arranged in the form of the corrector 25 to apply another audio process to the other singing voice such that a pitch of the other singing voice is corrected in tune along the harmony vocal part. The corrector 25 may include a muting section that mutes the other singing voice when the same is incorrectly sung at a rest event contained in the harmony vocal part. The corrector 25 may include a harmony section that operates when the other singing voice is not sung incorrectly to miss note events contained in the harmony vocal part for modifying the one singing voice to fit with the harmony vocal part in place of the other missing singing voice.

FIG. 4 is a schematic block diagram illustrating a second karaoke apparatus in which singing voice signals inputted from two microphones 31 and 32 are switched by a switching apparatus 1 to a main output terminal 6 for main melody output or a sub output terminal 7 for back chorus output. The main output terminal 6 of the switching apparatus 1 is connected to a mixer 36, and the sub output terminal 7 is connected to a corrector 37. One of the two microphones 31 and 32 is used by a singer who sings the main melody while the other microphone is used by another singer who sings the back chorus. In the switching apparatus 1, main melody data is inputted as reference from a karaoke player 33. Based on this main melody data, the switching apparatus 1 determines which of the inputted singing voice signals is the main melody. This determination is made when singing of one phrase has ended after start of karaoke music performance according to difference data for this one phrase. The switching apparatus 1 inputs the singing voice signal corresponding to the main melody into the mixer 36 and the other singing voice signal into the corrector 37. The corrector 37 corrects the frequency of the singing voice signal inputted from the switching apparatus 1 to the frequency of the correct back chorus in real time while the sub singer is singing the back chorus. Because the back chorus is difficult in its pitch and timing of singing, the sub singer sometimes gets out of pitch even if he or she thinks singing properly, or cannot sing at all. Therefore, the corrector 37 corrects this singing voice signal to the pitch of the back chorus. This correction is made based on back chorus data 39, which is MIDI data representing the back chorus. This back chorus data 39 is MIDI data included in the song data for karaoke performance, and read in synchronization with karaoke performance by the karaoke player 33. The corrector 37 corrects the inputted singing voice signal to the pitch of the correct back chorus, and attaches a chorus effect to the corrected singing voice signal by means of an incorporated chorus effector 38. The chorus effect is created such that voice signals having minutely shifted pitches and phases are added to sound as if many singers are singing at a time. The singing voice signal corrected in pitch and attached with the chorus effect is inputted from the corrector 37 into the mixer 36.

On the other hand, the karaoke player 33 retrieves song data for karaoke performance to sound a karaoke performance tone. This karaoke player 33 is composed of a tone generator 34 and a voice reproducer 35 for reproducing artificial voices such as back chorus. The voice reproducer 35 reproduces back chorus by decoding voice data obtained by performing PCM on a voice signal sampled from an actual back chorus voice. The orchestral accompaniment tone generated by the tone generator 34 and the artificial back chorus voice reproduced by the voice reproducer 35 are inputted in the mixer 36. The mixer 36 mixes together the orchestral accompaniment tone signal of karaoke music and the voice signal inputted from the karaoke player 33, the singing voice signal of the main melody inputted from the switching apparatus 1, and the singing voice signal of back chorus inputted from the corrector 37 at a predetermined gain ratio, and outputs the resultant signal as a 2-channel stereo signal. The mixer 36 is connected at its rear stage with an audio amplifier and a speaker by which this stereo signal is amplified and sounded.

In the above-mentioned embodiment, if a back chorus singer sings by mistake where back chorus is at rest and therefore should not be sung, the corrector 37 mutes this erroneously sung voice signal to prevent intervention in the main melody. The voice reproducer 35 of the karaoke player 33 generally reproduces back chorus as a part of karaoke performance. However, in order to make conspicuous the singing voice signal sung by the back chorus singer and to maintain the volume balance of back chorus, the mixer 36 is controlled if the singing voice signal of back chorus is inputted from the corrector 37 for muting the reproduced voice signal of back chorus inputted from the voice reproducer 35.

As described above, in the second karaoke apparatus shown in FIG. 4, the controller device contained in the switching apparatus 1 discriminates between one of the singing voices which is sung in tune along a solo vocal part and the other of the singing voices which is sung out of tune along a chorus vocal part. One of the output devices is arranged to apply an audio process to the one singing voice such that a pitch of the one singing voice is maintained, and the other of the output devices is arranged in the form of the corrector 37 and the chorus effector 38 to apply another audio process to the other singing voice such that a pitch of the other singing voice is corrected in tune along the chorus vocal part. The other output device may include a muting section that mutes the other singing voice when the same is incorrectly sung at a rest event contained in the chorus vocal part. The generator device in the karaoke player 33 may include a chorus section in the form of the voice reproducer 35 that operates for generating a synthetic singing voice. The mixer device 36 includes a section that operates when the other singing voice is not sung for mixing the synthetic singing voice to fill the chorus vocal part in place of the other singing voice, and that operates when the other singing voice is sung for muting the synthetic singing voice.

In a third karaoke apparatus shown in FIG. 5, signing voice signals inputted from two microphones 41 and 42 are switched by a switching apparatus 1 to a main output terminal 6 for main melody output or a sub output terminal 7 for back chorus output. Further, this karaoke apparatus generates a singing voice signal of harmony melody from the singing voice signal of main melody. The main output terminal 6 of the switching apparatus 1 is connected to a mixer 46, and the sub output terminal 7 is connected to a corrector 49. One of the two microphones is used by a main melody singer and the other is used by a back chorus singer. In the switching apparatus 1, main melody data is inputted as reference from a karaoke player 43. Based on this main melody data, the switching apparatus 1 determines which of the singing voice signals inputted from the microphones 41 and 42 carries the main melody. The determination is made when singing of one phrase has ended after start of karaoke music performance and based on difference data for this one phrase. The switching apparatus 1 inputs the singing voice signal carrying the main melody into a mixer 46 and a harmony generator 47, and inputs the other singing voice signal into the corrector 49.

The harmony generator 47 is provided as an output device that frequency-converts the singing voice signal of the main melody to generate a signing voice signal of the harmony melody. This frequency conversion is made based on harmony melody data 48, which is MIDI data representing the harmony melody. This harmony melody data 48 is included in the above-mentioned song data for karaoke performance, and retrieved in synchronization with the karaoke performance by the harmony generator 47. It should be noted that the technology for processing the main melody singing voice signal to generate the singing voice signal of harmony part is disclosed in Japanese Patent Application No. Hei 7-41767, for example. The singing voice signal of the harmony melody generated by the harmony generator 47 is inputted in the mixer 46.

The corrector 49 corrects the frequency of the singing voice signal sung as the back chorus to the frequency of the correct back chorus. This correction is made based on back chorus data 51, which is MIDI data representing a melody line of back chorus. This back chorus data 51 is MIDI data included in the song data for karaoke performance and read in synchronization with the karaoke performance by the corrector 49. The corrector 49 corrects the inputted singing voice signal to the pitch of the correct back chorus, and attaches a chorus effect by means of an incorporated chorus effector 50 to the corrected singing voice signal. The singing voice signal corrected in pitch by the corrector 49 and attached with the chorus effect by the effector 50 is then inputted in the mixer 46.

On the other hand, the karaoke player 43 reads the song data for karaoke performance to generate a karaoke performance tone. This karaoke player 43 is composed of a tone generator 44 for generating a musical instrument tone, and a voice reproducer 45 for reproducing voice such as back chorus. The voice reproducer 45 reproduces back chorus by decoding voice data obtained by performing PCM on a voice signal sampled from an actual back chorus. The musical instrument tone generated by the tone generator 44 and the voice of back chorus reproduced by the reproducer 45 are inputted in the mixer 46.

The mixer 46 mixes together the musical instrument tone signal of karaoke music and the reproduced voice signal such as back chorus inputted from the karaoke player 43, the singing voice signal of main melody inputted from the switching apparatus 1, the singing voice signal of harmony melody generated by the harmony generator 47, and the singing voice signal of back chorus corrected and attached with chorus effect by the corrector 49 at a predetermined gain ratio, and outputs the resultant signal as a 2-channel stereo signal. The mixer 46 is connected at its rear stage with an audio amplifier and a speaker by which this stereo signal is amplified and sounded.

In the above-mentioned embodiment, in order to make conspicuous the singing voice signal sung by the back chorus singer and to maintain the volume balance of back chorus, the mixer 26 may be controlled if the singing voice signal of back chorus is actually inputted from the effector 50 for muting the reproduced voice signal of back chorus inputted from the voice reproducer 45 of the karaoke player 43. Also, in the above-mentioned embodiment, if the back chorus singer sings by mistake where back chorus is at rest and therefore should not be sung, the corrector 49 mutes this erroneously sung voice signal to prevent intervention in the main melody.

In the above-mentioned embodiments, the singing voice signal of main melody is inputted from one of the two microphones, and the singing voice signal of harmony melody or back chorus is inputted from the other microphone. In some cases, singing voices of the same main melody is concurrently inputted from both of the microphones. Namely, two singers may sing the main melody at a time. In this case, the switching apparatus 1 determines, at the end of one phrase, which of the singing voices better matches the main melody. The switching apparatus 1 outputs the better matching singing voice as the main melody singing voice signal, and outputs the less matching singing voice or poorly sung singing voice as the harmony melody singing voice signal or back chorus singing voice signal. Consequently, the less matching singing voice is forcibly pitch-converted to the frequency of the harmony melody or back chorus by the corrector after the end of one phrase even if it is intended for the main melody. Namely, the controller device of the switching apparatus discriminates between one of the singing voices having a high matching degree and the other of the singing voices having a low matching degree. One of the output devices is arranged to apply an audio process to the one singing voice as a main vocal part, and the other of the output devices is arranged to apply another audio process to the other singing voice such that the other singing voice is converted into a sub vocal part such as a harmony part or a chorus part to support the main vocal part.

Such a capability of the above-mentioned embodiment may be applied to a game in which two singers compete for the main melody. In such a game, the two singers start singing the main melody at the same time. First, the singing voices of both singers are outputted from the speaker in unison. After the end of one or more phrase, the singing voice of the winner is kept outputted as it is, while the singing voice of the loser is forcibly pitch-converted to the harmony melody or back chorus.

In addition, when using the above-mentioned karaoke apparatus in the game, the corrector of the karaoke apparatus may be prevented from functioning. Alternatively, the corrector may be removed from the karaoke apparatus. That is, the signal outputted from the sub output terminal 7 of the switching apparatus 1 may be prevented from sounding. This arrangement can implement a compete-for-microphone game in which two singers start singing the main melody at the same time through different microphones. At the end of one or more phrase, only the better sung singing voice signal is outputted while the other singing voice signal is cut. Namely, the controller device of the switching apparatus discriminates between one of the singing voices having a high matching degree and the other of the singing voices having a low matching degree. One of the output devices is arranged to apply an audio process to the one singing voice such that the one singing voice having the high matching degree is sounded, and the other of the output devices is arranged to apply another audio process to the other singing voice such that the other singing voice having the low matching degree is muted.

Figure 7:
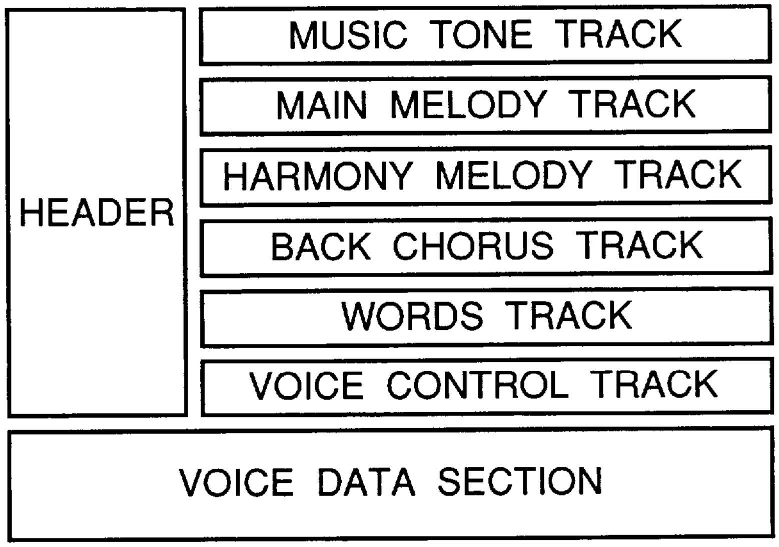
FIG. 7 is a diagram illustrating constitution of song data used in the karaoke apparatus of FIG. 6.
Figure 6:
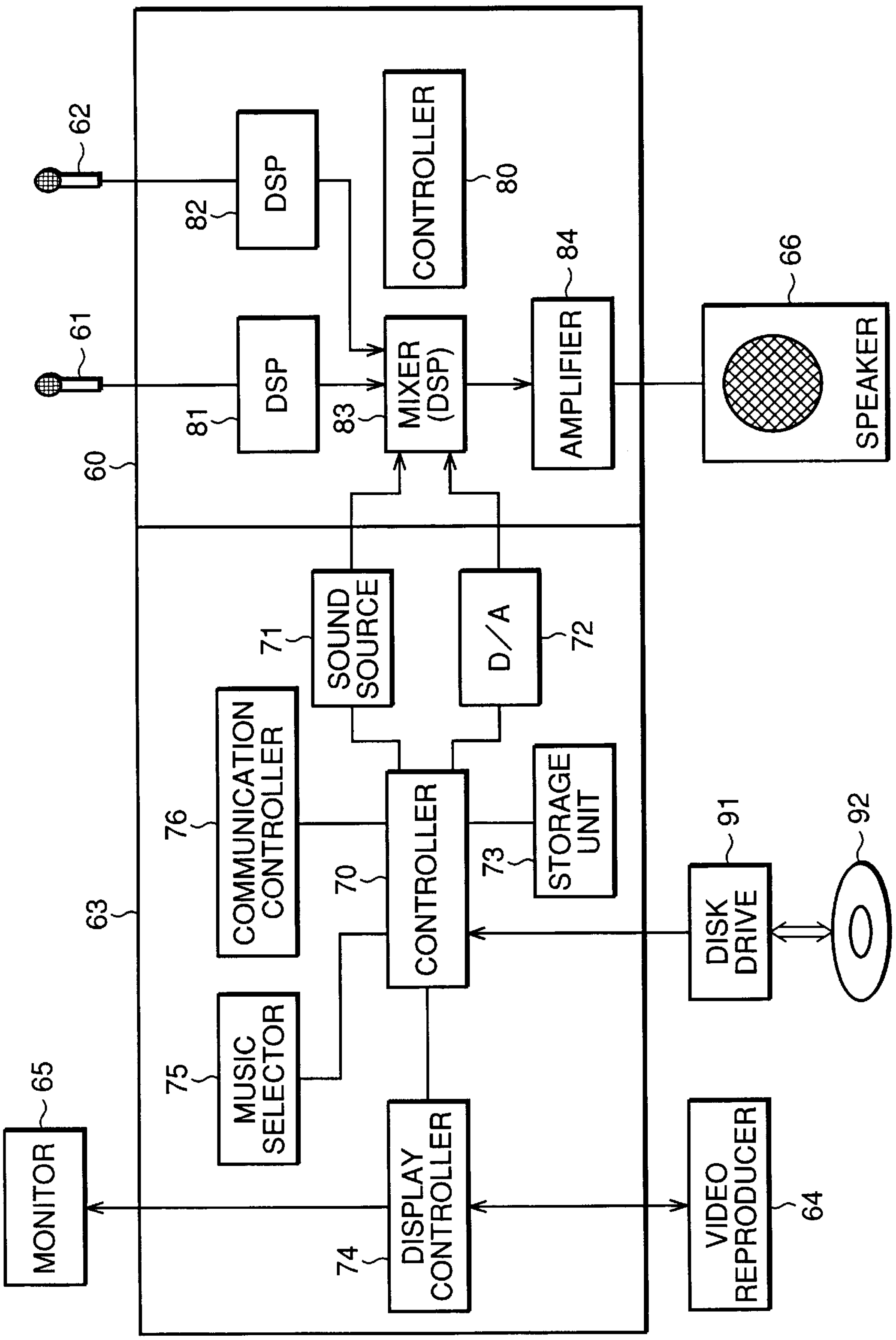
FIG. 6 is a block diagram illustrating construction of a karaoke apparatus using the voice signal switching apparatus of FIG. 1.

FIG. 6 is a block diagram illustrating a karaoke apparatus that incorporates therein the switching apparatus having the capabilities shown in FIGS. 1 through 5. FIG. 7 shows constitution of song data for use in the above-mentioned karaoke apparatus. This karaoke apparatus is composed of two microphones 61 and 62, a karaoke main unit 63, a mixing amplifier unit 60, a video reproducer 64, a monitor 65, a speaker 66 and a disk drive 91 for receiving a machine readable medium 92. The operation of the karaoke main unit 63 is controlled by a controller 70 which includes a CPU. The controller 70 is connected to a storage unit 73, a sound source 71, a D/A converter 72, a display controller 74, a music selector 75, and a communication controller 76. The storage unit 73 is constituted by a hard disk or the like to store song data for about 10,000 pieces of music. The music selector 75 receives a music selection code outputted from an infrared remote commander, not shown, and inputs the received code into the controller 70. The controller 70 reads song data corresponding to the received music selection code, and processes the read song data sequentially according to an appropriate tempo, thereby making karaoke performance.

In the diagram of the song data shown in FIG. 7, the song data is composed of a header, a music tone track, a main melody track, a harmony melody track, a back chorus track, a words track, a voice control track, and a voice data section. In the header, various data associated with this piece of music are written. To be more specific, the header contains data such as a selection code of this song data, a genre code indicating a genre to which this piece of music belongs, the title, release date, and play time of this piece of music. Based on the genre code, the controller 70 selects video to be displayed on the monitor 65, and instructs the video reproducer 64 for reproduction of the selected video. The video reproducer 64 is constituted by an LD changer for reproducing a plurality of video disks, for example, and reproduces a specified video and inputs the reproduced video into the display controller 74.

Each of the music tone track through voice control track is described in a MIDI format. Each track is composed of a plurality of pieces of event data and duration data indicating a time interval between these pieces of event data. The music tone track is formed with subtracks of various parts such as a melody track and a rhythm track. The controller 70 inputs the event data of this music tone track into the sound source 71 in a timing specified by the duration data. Based on the inputted event data, the sound source 71 generates a tone signal of the instrumental accompaniment. The main melody track, the harmony melody track, and the back chorus track contain main melody data, harmony melody data, and back chorus data, respectively. The harmony melody data is inputted in the mixing amplifier unit 60 for correcting or generating the above-mentioned harmony melody singing voice signal. The back chorus data is also inputted in the mixing amplifier unit 60 for correcting the back chorus signing voice signal. In the mixing amplifier unit 60, a controller 80 having a CPU receives these pieces of data, and inputs the received data into DSP 81 or 82 whichever is corresponding to the received data.

The words track stores character code data as event data for displaying words on the monitor 65. The controller 70 inputs the event data of this words track into the display controller 74 in a timing specified by the duration data. The display controller 74 superimposes a character pattern of words data inputted from the controller 70 onto the video inputted from the video reproducer 64, and displays the superimposed image on the monitor 65.

The voice data section is made up of a plurality of pieces of voice data. The voice data is obtained by performing PCM on a singing voice sampled from model back chorus. Because back chorus is not sung all along a piece of music, only each phrase is taken out and divided into a plurality of pieces of data. The voice control track stores voice specification data as event data for instructing generation of each piece of voice data stored in the voice data section. The controller 70 reads the voice specification data in a timing specified by the duration data. Further, the controller 70 inputs voice data specified by this voice specification data into the D/A converter 72. The D/A converter 72 decodes the voice data which is PCM data into an analog voice signal, and inputs the same into a mixer 83 of the mixing amplifier unit 60.

The mixing amplifier unit 60 has the mixer 83, the DSP 81, the DSP 82, and an amplifier 84, operations of which are controlled by the controller 80. The DSP 81 and the DSP 82 are connected to the microphones 61 and 62, respectively. Using the microphones 61 and 62, the singing voice signal of main melody is inputted from one microphone, while the singing voice signal of harmony melody or chorus is inputted from the other. The DSP 61 and the DSP 62 calculate difference data between the inputted singing voice signals and the reference, and input the calculated difference data into the controller 80. Based on the inputted difference data, the controller 80 determines which of the inputted singing voice signals is identical to the main melody or closer to the main melody. Then, the controller 80 instructs the DSP in which the singing voice signal closer to the main melody is inputted for processing the singing voice as the main melody, and instructs the other DSP in which the other singing voice signal is inputted for processing the other singing voice as the harmony melody or back chorus. Namely, in the present embodiment, connection of the microphones 61 and 62 are not switched therebetween; rather, the functions of the DSP 81 and the DSP 82 are switched interchangeably to implement the capability of the singing voice signal switching apparatus shown in FIG. 1.

The mixer 83 is inputted with the tone signal formed by the sound source 71, the back chorus voice signal decoded by the D/A converter 72, and the singing voice signals processed by the DSP 81 and the DSP 82. The row singing voice signals inputted from the microphones 61 and 62 are also inputted in the mixer 83 via the DSP 81 and the DSP 82. The mixer 83 mixes these signals at a predetermined gain ratio, and outputs the resultant signal as a 2-channel stereo signal. This signal is amplified by the amplifier 84 and the amplified signal is sounded from the speaker 66.

In the above-mentioned embodiment, the frequency of the inputted singing voice signal is corrected or converted by the DSP to provide the singing voice signal of harmony melody or back chorus. Not only the frequency but also the volume and timbre of male and female voices may be converted to provide the singing voice signals that sound like harmony melody or back chorus more realistically.

The invention includes the machine readable medium 92 such as a floppy disk or a CO-ROM disk for use in the switching apparatus having a CPU of the controllers 70 and 80 and discriminating a plurality of singing voices from each other based on a reference melody in order to distribute the discriminated singing voices to different audio processes. The medium 92 contains program instructions executable by the CPU for causing the apparatus to perform the steps of collecting a plurality of singing voices separately from each other by means of a plurality of input devices, each input device producing a voice signal which carries an individual melody of the singing voice collected by each input device, distributing the voice signals collected by each input device separately from each other to the different audio processes through a plurality of output terminals, providing a plurality of electrical paths which are switchable with each other so as to interchangeably pass the voice signals from the plurality of the input devices to the plurality of the output terminals through the electrical paths, detecting matching degrees of the individual melodies carried by the voice signals with respect to the reference melody so as to discriminate the voice signals from each other, and switching the electrical paths based on the examined matching degrees so as to route the discriminated voice signals from the plurality of the input devices to the plurality of the output terminals.

Preferably, the step of collecting comprises collecting each singing voice such that each input device produces the voice signal carrying the individual melody containing a leading section and a subsequent section, and the step of switching comprises switching the electrical paths based on the matching degrees detected during the leading sections of the individual melodies, and thereafter maintaining the switched electrical paths during the subsequent sections of the individual melodies.

Preferably, the step of detecting comprises detecting a difference between each individual melody and the reference melody to calculate a score point of each singing voice, and comparing the score points of the singing voices with each other to determine the matching degrees of the singing voices.

Further, the inventive machine readable medium 92 is for use in the karaoke apparatus having a CPU and playing a karaoke song according to song data jointly with at least a pair of singing voices while applying thereto different audio processes. The medium 92 contains program instructions executable by the CPU for causing the karaoke apparatus to perform the steps of processing the song data to produce an orchestral accompaniment sound during the course of play of the karaoke song, collecting a pair of singing voices having melodies different from each other by means of a pair of input devices, applying the different audio processes to the singing voices separately from each other by means of a pair of output devices, providing a pair of paths which are switchable with each other so as to interchangeably distribute the singing voices from the pair of the input devices to the pair of the output devices, detecting matching degrees of the melodies carried by the singing voices with respect to a reference melody specified by the song data so as to discriminate the singing voices from each other, switching the paths based on the detected matching degrees so as to route the discriminated singing voices from the pair of the input devices to the pair of the output devices, and mixing the singing voices fed from the output devices with the orchestral accompaniment sound to thereby effect play of the karaoke song.

Preferably, the step of detecting includes discriminating between one of the singing voices having a high matching degree and the other of the singing voices having a low matching degree, and the step of applying comprises applying an audio process to the one singing voice as a main vocal part by one of the output devices and applying another audio process to the other singing voice by the other of the output devices such that the other singing voice is converted into a sub vocal part to support the main vocal part.

Preferably, the step of detecting includes discriminating between one of the singing voices having a high matching degree and the other of the singing voices having a low matching degree, and the step of applying comprises applying an audio process to the one singing voice by one of the output devices such that the one singing voice having the high matching degree is sounded and applying another audio process to the other singing voice by the other of the output devices such that the other singing voice having the low matching degree is muted.

Figure 8:
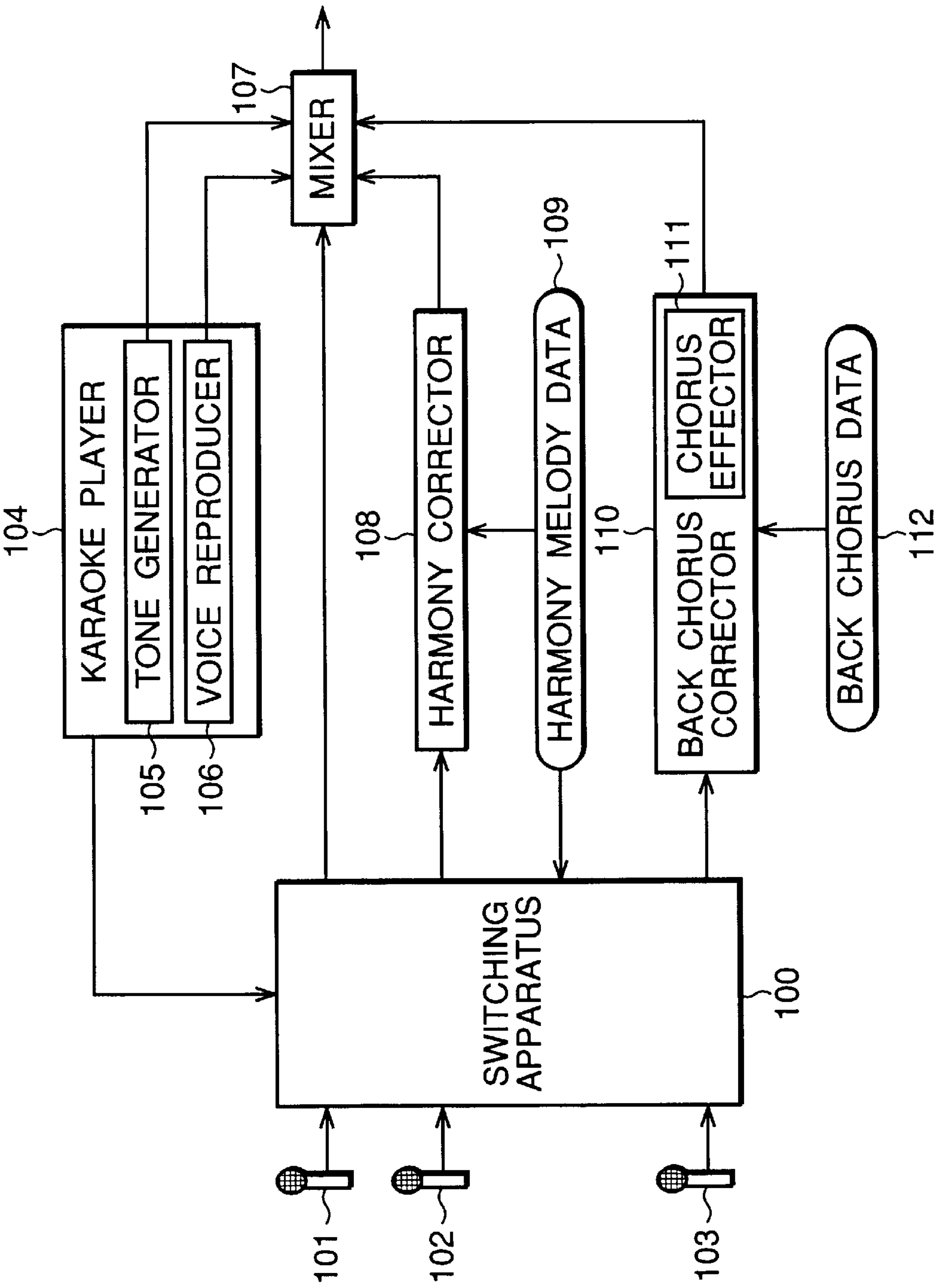
FIG. 8 is a schematic block diagram illustrating a karaoke apparatus having a voice signal switching apparatus for switching three singing voice signals.

In the embodiments of FIGS. 3 through 6, there are two systems of microphone input. As required, three microphones may be connected to make them available to the singers of main melody, harmony melody, and back chorus, respectively. This arrangement is shown in FIG. 8. As shown, a switching apparatus 100 is connected to three microphones 101, 102, and 103. A first output terminal of the switching apparatus 100 is connected to a mixer 107, a second output terminal is connected to a harmony corrector 108, and a third output terminal is connected to a back chorus corrector 110. In the switching apparatus 100, main melody data and harmony melody data are inputted as reference. Among the singing voice signals inputted from the three microphones 101, 102, and 103, the switching apparatus 100 outputs the signal closest to the main melody from the first output terminal as the main melody singing voice signal, the signal closest to the harmony melody from the second output terminal as the harmony melody singing voice signal, and the last signal from the third output terminal as the back chorus singing voice signal. This determination is performed at the end of one phrase after start of karaoke music. This determination is performed based on difference data for this one phrase. Namely, in this embodiment, two melodies of main melody and harmony melody are used as reference melodies.

The harmony corrector 108 corrects the frequency of the inputted harmony melody singing voice signal to the frequency of the correct harmony melody. The frequency-corrected harmony melody singing voice signal is inputted in the mixer 107. The back chorus corrector 110 corrects the frequency of the inputted chorus singing voice signal to the frequency of the correct back chorus, and attaches an chorus effect to this singing voice signal by an incorporated chorus effector 111. The singing voice signal corrected in pitch and attached with the chorus effect by the back chorus corrector 110 is inputted in the mixer 107.

On the other hand, the karaoke player 104 reads the song data for karaoke performance to generate a karaoke performance tone. This karaoke player 104 is composed of a tone generator 105 for generating a musical instrument tone, and a voice reproducer 106 for reproducing a voice such as back chorus. The musical instrument tone generated by the tone generator 105 and the voice such as back chorus reproduced by the voice reproducer 106 are inputted in the mixer 107. The mixer 107 mixes the musical instrument tone signal of karaoke music and the reproduced voice signal such as back chorus inputted from the karaoke player 104, the main melody singing voice signal inputted from the switching apparatus 100, the harmony melody singing voice signal inputted from the harmony corrector 108, and the back chorus singing voice signal inputted from the back chorus corrector 110 at a predetermined gain ratio, and outputs the resultant signal as a 2-channel stereo signal. The mixer 107 is connected at its rear stage with an audio amplifier and a speaker by which this stereo signal is amplified and sounded.

In the above-mentioned embodiment, if a harmony melody is sung by mistake where no harmony melody note event is present, the harmony corrector 108 mutes this singing voice signal to protect the main melody from being interfered. If a back chorus is sung by mistake where no back chorus note event is present, the back chorus corrector 110 mutes this singing voice signal to protect the main melody from being interfered. Moreover, when a back chorus is being sung correctly, the mixer 107 mutes the reproduced back chorus voice signal inputted from the voice reproducer 106 of the karaoke apparatus 104 to make conspicuous the singing voice of the correctly sung back chorus.

If the main melody, the harmony melody, and the back chorus are inputted from three microphones separately, the singing voice signals of these singing voices are determined and the output destinations of these signals are switched correctly. This arrangement allows many singers to sing on the karaoke apparatus without being conscious of the selection of the microphones. It is also practicable in this embodiment to separate in the apparatus a plurality of singing voice signals inputted from one or two microphones. This separation of singing voice signals is disclosed in Japanese Patent Application Nos. Hei 7-303046 and Hei 7-303047, for example.

As described and according to the invention, a plurality of singing voice signals inputted from singing input means are outputted to a plurality of output modules according to the degree of matching with a particular melody in an interchangeable manner. Consequently, if singing voice signals of a plurality of parts are inputted from any singing input means, the part of each singing voice signal is determined and each signal is outputted to its corresponding output module. As a result, if a plurality of singing parts are collected through any microphones, the part of the singing voice signal inputted from each microphone is determined and optimum processing is performed on the determined signal to be outputted. In addition, by setting the gain of some of output modules to zero, the singing voice signals allocated to such output modules are muted and hence not outputted, thereby cutting poorly sung singing voices. According to the invention, matching degree is determined on the melody data for a predetermined interval from the beginning of the karaoke play, thereby allowing the above-mentioned switching without much delaying behind the start of singing. In addition, because the determination does not change halfway through singing, the singing part of a particular singer does not change halfway, thereby preventing the singer from being confused.

While the preferred embodiments of the present invention have been described using specific terms, such description is for illustrative purposes only, and it is to be understood that changes and variations may be made without departing from the spirit or scope of the appended claims.

What is claimed is:

1. An apparatus for discriminating a plurality of singing voices from each other based on a reference melody in order to pass the discriminated singing voices to different audio processes:

a plurality of input devices that collect a plurality of singing voices separately from each other, each input device producing a voice signal which carries an individual melody of the singing voice collected by each input device;

a plurality of output terminals that are arranged to pass the voice signals separately from each other to the different audio processes;

a switch circuit that provides a plurality of electrical paths which are switchable with each other so as to distribute the voice signals from the plurality of the input devices to the plurality of the output terminals through the electrical paths; and a controller device that examines matching degrees of the individual melodies carried by the voice signals with respect to the reference melody so as to discriminate the voice signals from each other, and that controls the switch circuit based on the examined matching degrees to switch the electrical paths to thereby route the discriminated voice signals from the plurality of the input devices to the plurality of the output terminals.

2. An apparatus according to claim 1, wherein each input device produces the voice signal carrying the individual melody containing a leading section and a subsequent section, and wherein the controller device controls the switch circuit based on the matching degrees examined for the leading sections of the individual melodies to switch the electrical paths, and thereafter maintains the switched electrical paths for the subsequent sections of the individual melodies.

3. An apparatus according to claim 1, wherein the controller device comprises a detector that detects a difference between each individual melody and the reference melody to calculate a score point of each singing voice, and a comparator that compares the score points of the singing voices with each other to determine the matching degrees of the singing voices.

4. A karaoke apparatus for playing a karaoke song according to song data jointly with at least a pair of singing voices while applying thereto different audio processes, the karaoke apparatus comprising:

a generator device that processes the song data to produce an orchestral accompaniment sound during the course of play of the karaoke song;

a pair of input devices that collect a pair of singing voices having melodies different from each other;

a pair of output devices that are arranged to apply the different audio processes to the singing voices separately from each other;

a switch device that provides a pair of paths which are switchable with each other so as to distribute the singing voices from the pair of the input devices to the pair of the output devices;

a controller device that examines matching degrees of the melodies carried by the singing voices with respect to a reference melody specified by the song data so as to discriminate the singing voices from each other, and that controls the switch device based on the examined matching degrees to switch the paths to thereby route the discriminated singing voices from the plurality of the input devices to the plurality of the output devices; and a mixer device that mixes the singing voices fed from the output devices with the orchestral accompaniment sound to thereby effect play of the karaoke song.

5. A karaoke apparatus according to claim 4, wherein the controller device discriminates between one of the singing voices having a high matching degree and the other of the singing voices having a low matching degree, and wherein one of the output devices is arranged to apply an audio process to the one singing voice as a main vocal part and the other of the output devices is arranged to apply another audio process to the other singing voice such that the other singing voice is converted into a sub vocal part to support the main vocal part.

6. A karaoke apparatus according to claim 4, wherein the controller device discriminates between one of the singing voices having a high matching degree and the other of the singing voices having a low matching degree, and wherein one of the output devices is arranged to apply an audio process to the one singing voice such that the one singing voice having the high matching degree is sounded and the other of the output devices is arranged to apply another audio process to the other singing voice such that the other singing voice having the low matching degree is muted.

7. A karaoke apparatus according to claim 4, wherein the controller device discriminates between one of the singing voices which is sung in tune along a main vocal part and the other of the singing voices which is sung out of tune along a harmony vocal part, and wherein one of the output devices is arranged to apply an audio process to the one singing voice such that a pitch of the one singing voice is maintained and the other of the output devices is arranged to apply another audio process to the other singing voice such that a pitch of the other singing voice is corrected in tune along the harmony vocal part.

8. A karaoke apparatus according to claim 7, wherein the other output device includes a muting section that mutes the other singing voice when the same is incorrectly sung at a rest event contained in the harmony vocal part.

9. A karaoke apparatus according to claim 7, wherein the one output device includes a harmony section that operates when the other singing voice is not sung incorrectly to miss note events contained in the harmony vocal part for modifying the one singing voice to fit with the harmony vocal part in place of the other missing singing voice.

10. A karaoke apparatus according to claim 4, wherein the controller device discriminates between one of the singing voices which is sung in tune along a solo vocal part and the other of the singing voices which is sung out of tune along a chorus vocal part, and wherein one of the output devices is arranged to apply an audio process to the one singing voice such that a pitch of the one singing voice is maintained and the other of the output devices is arranged to apply another audio process to the other singing voice such that a pitch of the other singing voice is corrected in tune along the chorus vocal part.

11. A karaoke apparatus according to claim 10, wherein the other output device includes a muting section that mutes the other singing voice when the same is incorrectly sung at a rest event contained in the chorus vocal part.

12. A karaoke apparatus according to claim 10, wherein the generator device includes a chorus section that generates a synthetic singing voice, and wherein the mixer device includes a section that operates when the other singing voice is not sung for mixing the synthetic singing voice to fill the chorus vocal part in place of the other singing voice, and that operates when the other singing voice is sung for muting the synthetic singing voice.

13. A karaoke apparatus according to claim 10, wherein the one output device includes a harmony section that creates a harmony singing voice which is derived from the one singing voice and which is made consonant with the one singing voice.

14. A method of discriminating a plurality of singing voices from each other based on a reference melody in order to distribute the discriminated singing voices to different audio processes, the method comprising the steps of:

collecting a plurality of singing voices separately from each other by means of a plurality of input devices, each input device producing a voice signal which carries an individual melody of the singing voice collected by each input device;

distributing the voice signals collected by each input device separately from each other to the different audio processes through a plurality of output terminals;

providing a plurality of electrical paths which are switchable with each other so as to interchangeably pass the voice signals from the plurality of the input devices to the plurality of the output terminals through the electrical paths;

detecting matching degrees of the individual melodies carried by the voice signals with respect to the reference melody so as to discriminate the voice signals from each other; and switching the electrical paths based on the examined matching degrees so as to route the discriminated voice signals from the plurality of the input devices to the plurality of the output terminals.

15. A method according to claim 14, wherein the step of collecting comprises collecting each singing voice such that each input device produces the voice signal carrying the individual melody containing a leading section and a subsequent section, and wherein the step of switching comprises switching the electrical paths based on the matching degrees detected during the leading sections of the individual melodies, and thereafter maintaining the switched electrical paths during the subsequent sections of the individual melodies.

16. A method according to claim 14, wherein the step of detecting comprises detecting a difference between each individual melody and the reference melody to calculate a score point of each singing voice, and comparing the score points of the singing voices with each other to determine the matching degrees of the singing voices.

17. A method of playing a karaoke song according to song data jointly with at least a pair of singing voices while applying thereto different audio processes, the method comprising the steps of:

processing the song data to produce an orchestral accompaniment sound during the course of play of the karaoke song;

collecting a pair of singing voices having melodies different from each other by means of a pair of input devices;

applying the different audio processes to the singing voices separately from each other by means of a pair of output devices;

providing a pair of paths which are switchable with each other so as to interchangeably distribute the singing voices from the pair of the input devices to the pair of the output devices;

detecting matching degrees of the melodies carried by the singing voices with respect to a reference melody specified by the song data so as to discriminate the singing voices from each other;

switching the paths based on the detected matching degrees so as to route the discriminated singing voices from the pair of the input devices to the pair of the output devices; and mixing the singing voices fed from the output devices with the orchestral accompaniment sound to thereby effect play of the karaoke song.

18. A method according to claim 17, wherein the step of detecting includes discriminating between one of the singing voices having a high matching degree and the other of the singing voices having a low matching degree, and wherein the step of applying comprises applying an audio process to the one singing voice as a main vocal part by one of the output devices and applying another audio process to the other singing voice by the other of the output devices such that the other singing voice is converted into a sub vocal part to support the main vocal part.

19. A method according to claim 17, wherein the step of detecting includes discriminating between one of the singing voices having a high matching degree and the other of the singing voices having a low matching degree, and wherein the step of applying comprises applying an audio process to the one singing voice by one of the output devices such that the one singing voice having the high matching degree is sounded and applying another audio process to the other singing voice by the other of the output devices such that the other singing voice having the low matching degree is muted.

20. A machine readable medium for use in an apparatus having a CPU and discriminating a plurality of singing voices from each other based on a reference melody in order to distribute the discriminated singing voices to different audio processes, the medium containing program instructions executable by the CPU for causing the apparatus to perform the steps of:

collecting a plurality of singing voices separately from each other by means of a plurality of input devices, each input device producing a voice signal which carries an individual melody of the singing voice collected by each input device;

distributing the voice signals collected by each input device separately from each other to the different audio processes through a plurality of output terminals;

providing a plurality of electrical paths which are switchable with each other so as to interchangeably pass the voice signals from the plurality of the input devices to the plurality of the output terminals through the electrical paths;

detecting matching degrees of the individual melodies carried by the voice signals with respect to the reference melody so as to discriminate the voice signals from each other; and switching the electrical paths based on the examined matching degrees so as to route the discriminated voice signals from the plurality of the input devices to the plurality of the output terminals.

21. A machine readable medium according to claim 20, wherein the step of collecting comprises collecting each singing voice such that each input device produces the voice signal carrying the individual melody containing a leading section and a subsequent section, and wherein the step of switching comprises switching the electrical paths based on the matching degrees detected during the leading sections of the individual melodies, and thereafter maintaining the switched electrical paths during the subsequent sections of the individual melodies.

22. A machine readable medium according to claim 20, wherein the step of detecting comprises detecting a difference between each individual melody and the reference melody to calculate a score point of each singing voice, and comparing the score points of the singing voices with each other to determine the matching degrees of the singing voices.

23. A machine readable medium for use in a karaoke apparatus having a CPU and playing a karaoke song according to song data jointly with at least a pair of singing voices while applying thereto different audio processes, the medium containing program instructions executable by the CPU for causing the karaoke apparatus to perform the steps of:

processing the song data to produce an orchestral accompaniment sound during the course of play of the karaoke song;

collecting a pair of singing voices having melodies different from each other by means of a pair of input devices;

applying the different audio processes to the singing voices separately from each other by means of a pair of output devices;

providing a pair of paths which are switchable with each other so as to interchangeably distribute the singing voices from the pair of the input devices to the pair of the output devices;

detecting matching degrees of the melodies carried by the singing voices with respect to a reference melody specified by the song data so as to discriminate the singing voices from each other;

switching the paths based on the detected matching degrees so as to route the discriminated singing voices from the pair of the input devices to the pair of the output devices; and mixing the singing voices fed from the output devices with the orchestral accompaniment sound to thereby effect play of the karaoke song.

24. A machine readable medium according to claim 23, wherein the step of detecting includes discriminating between one of the singing voices having a high matching degree and the other of the singing voices having a low matching degree, and wherein the step of applying comprises applying an audio process to the one singing voice as a main vocal part by one of the output devices and applying another audio process to the other singing voice by the other of the output devices such that the other singing voice is converted into a sub vocal part to support the main vocal part.

25. A machine readable medium according to claim 23, wherein the step of detecting includes discriminating between one of the singing voices having a high matching degree and the other of the singing voices having a low matching degree, and wherein the step of applying comprises applying an audio process to the one singing voice by one of the output devices such that the one singing voice having the high matching degree is sounded and applying another audio process to the other singing voice by the other of the output devices such that the other singing voice having the low matching degree is muted.

* * * * *